(12) United States Patent
Bergheaud et al.

(10) Patent No.: US 7,856,536 B2
(45) Date of Patent: Dec. 21, 2010

(54) PROVIDING A PROCESS EXCLUSIVE ACCESS TO A PAGE INCLUDING A MEMORY ADDRESS TO WHICH A LOCK IS GRANTED TO THE PROCESS

(75) Inventors: Philippe Bergheaud, Colmar (FR); Dinesh Kumar Subhraveti, Milpitas, CA (US); Marc Philippe Vertes, Saint-Lys (FR)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 11/868,447

(22) Filed: Oct. 5, 2007

(65) Prior Publication Data

US 2009/0094430 A1   Apr. 9, 2009

(51) Int. Cl.
*G06F 12/00* (2006.01)
(52) U.S. Cl. ............... 711/150; 711/168; 711/E12.044
(58) Field of Classification Search ................. 711/163, 711/167, 168, 169
See application file for complete search history.

(56) References Cited

U.S. PATENT DOCUMENTS

| | | | |
|---|---|---|---|
| 5,095,421 A * | 3/1992 | Freund .................. | 718/101 |
| 5,129,080 A | 7/1992 | Smith | |
| 5,285,528 A * | 2/1994 | Hart ..................... | 710/200 |
| 5,502,840 A | 3/1996 | Barton | |
| 5,590,277 A | 12/1996 | Fuchs et al. | |
| 5,790,851 A * | 8/1998 | Frank et al. .............. | 718/104 |
| 5,805,790 A | 9/1998 | Nota et al. | |
| 5,815,651 A * | 9/1998 | Litt ...................... | 714/10 |
| 5,966,543 A | 10/1999 | Hartner et al. | |
| 6,003,066 A | 12/1999 | Ryan et al. | |
| 6,625,635 B1 | 9/2003 | Elnozahy | |
| 6,625,751 B1 | 9/2003 | Starovic et al. | |
| 6,769,073 B1 | 7/2004 | Shapiro | |
| 6,772,367 B1 | 8/2004 | Tarafdar et al. | |

(Continued)

FOREIGN PATENT DOCUMENTS

WO   2006077261 A2   7/2006

OTHER PUBLICATIONS

U.S. Patent Application entitled "Monitoring Patterns of Processes Accessing Addresses in a Storage Device to Determine Access Parameters to Apply", Serial No. unknown, filed Oct. 5, 2007, by inventors P. Sarkar and D.K. Subhraveti.

(Continued)

*Primary Examiner*—Kevin L Ellis
*Assistant Examiner*—Gurtej Bansal
(74) *Attorney, Agent, or Firm*—David W. Victor; Konrad Raynes and Victor LLP

(57) ABSTRACT

Provided are a method, system, and article of manufacture for providing a process exclusive access to a page including a memory address to which a lock is granted to the process. A request is received for a memory address in a memory device from a requesting process. A lock is granted to the requested memory address to the requesting process. The requesting process is provided exclusive access to a page including the requested memory address for a page access time period. The exclusive access to the page provided to the requesting process is released in response to an expiration of the page access time period.

20 Claims, 6 Drawing Sheets

U.S. PATENT DOCUMENTS

| | | | |
|---|---|---|---|
| 6,792,497 B1 * | 9/2004 | Gold et al. | 710/317 |
| 6,832,367 B1 | 12/2004 | Choi et al. | |
| 6,851,075 B2 | 2/2005 | Ur et al. | |
| 6,886,162 B1 * | 4/2005 | McKenney | 718/102 |
| 6,920,634 B1 | 7/2005 | Tudor | |
| 6,961,865 B1 | 11/2005 | Ganesh et al. | |
| 7,062,583 B2 | 6/2006 | Kolinummi et al. | |
| 7,185,236 B1 | 2/2007 | Moser et al. | |
| 7,206,964 B2 | 4/2007 | Moser et al. | |
| 7,240,057 B2 * | 7/2007 | Kingsbury et al. | 707/8 |
| 2002/0013802 A1 | 1/2002 | Mori et al. | |
| 2002/0083149 A1 | 6/2002 | Van Huben et al. | |
| 2004/0177130 A1 | 9/2004 | Chambliss et al. | |
| 2004/0236990 A1 | 11/2004 | Pavlik et al. | |
| 2005/0071760 A1 | 3/2005 | Jaeger | |
| 2005/0149634 A1 | 7/2005 | McKenney | |
| 2005/0177821 A1 | 8/2005 | Ogata et al. | |
| 2005/0251794 A1 | 11/2005 | Taylor et al. | |
| 2005/0262411 A1 | 11/2005 | Vertes et al. | |
| 2006/0085784 A1 | 4/2006 | Traut et al. | |
| 2006/0136640 A1 | 6/2006 | Tuan | |
| 2006/0143512 A1 | 6/2006 | Jia et al. | |
| 2006/0184935 A1 | 8/2006 | Abels et al. | |
| 2009/0119549 A1 | 5/2009 | Vertes | |

OTHER PUBLICATIONS

U.S. Patent Application entitled "Recovery of Application Faults in a Mirrored Application Environment", Serial No. unknown, filed Oct. 5, 2007, by inventors R.E. Harper and D.K. Subhraveti.

U.S. Patent Application entitled "Varying Access Parameters for Processes to Access Memory Addresses in Response to Detecting a Condition Related to a Pattern of Processes Access to Memory Addresses", Serial No. unknown, filed Oct. 5, 2007, by inventors P. Sarkar and D.K. Subhraveti.

Bergheaud, et al., "Fault Tolerance in Multiprocessor Systems Via Application Cloning", 27th International Conference on Distributed Computing Systems, 2007, pp. 1-10.

Christiaens, et al., "Record/Replay in the Presence of Benign Data Races", 2002, pp. 1-7.

Daniel, et al., "Transparent Process Replication", 2000, pp. 1-6.

Dunlap, et al., "ReVirt: Enabling Intrusion Analysis Through Virtual-Machine Logging and Replay", Proceedings of the 2002 Symposium on Operating Systems Design and Implementation (OSDI), 2002, pp. 1-14.

He, et al., "Preemption Adaptivity in Time-Published Queue-Based Spin Locks", Dept. of Computer Science University of Rochester, NY, 2005, pp. 1-12.

Huangs, et al., "Handling Catastrophic Failures in Scalable Internet Applications", IEEE, 2004, pp. 1-7.

Krammer et al., "Marmot: An MPI Analysis and Checking Tool", High Performance Computer Center Stuttgart, Germany, 2004, pp. 1-6.

Kranzmuller, "Event Graph Analysis for Debugging Massively Parallel Programs", Dept. for Graphics and Parallel Processing Joh. Kepler University Linz, Austria, Sep. 2000, pp. 1-344.

Lim, "Reactive Synchronization Algorithms for Multiprocessors", Massachusetts Institute of Technology, 1995, pp. 1-162.

Marathe, et al., "Composite Abortable Locks", IEEE, 2006, pp. 1-10.

Mellor-Crummey, et al., "A Software Instruction Counter", ACM, 1989, pp. 78-86.

Osman et al., "The Design and Implementation of Zap: A System for Migrating Computing Environments", Proceedings of the 5th Symposium on Operating Systems Design and Implementation (OSDI 2002), Dec. 2002, pp. 1-16.

Russinovich, et al., "Operating System Support for Replay of Concurrent Non-Deterministic Shared Memory Applications", Dept. of Computer Science University of Oregon, 1996, pp. 1-5.

Slye, et al., "Support for Software Interrupts in Log-Based Rollback-Recovery", 26th Symposium on Fault-Tolerant Computer Systems, Jun. 1996, pp. 1-20.

* cited by examiner

PROVIDING A PROCESS EXCLUSIVE ACCESS TO A PAGE INCLUDING A MEMORY ADDRESS TO WHICH A LOCK IS GRANTED TO THE PROCESS

BACKGROUND OF THE INVENTION

1. Field of the Invention

The present invention relates to a method, system, and article of manufacture for providing a process exclusive access to a page including a memory address to which a lock is granted to the process.

2. Description of the Related Art

Application processes may concurrently access memory addresses in a shared memory. A process may comprise one or more threads allocated processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions. To access the memory addresses, the processes must obtain a spinlock for each address. If the spinlock is not available or granted to another process, then the process must repeatedly check until the spinlock becomes available. If one process holds the spinlock for a memory address, then other processes attempting to access that locked memory address continue to use processing resources to retry the access request until they obtain the spinlock. While a process is waiting to retry the request for a locked memory address to obtain the spinlock, the retrying process continually accesses the memory bus, which further consumes processing resources and delays other processes from accessing the memory bus. Thus, the use of spinlocks may be computationally expensive if one process holds the spinlock for an extended period of time while many other processes are waiting to access the spinlock for the memory address.

One technique for avoiding the costs of spinlocks is to provide the process seeking access to a memory address exclusive access to a page including the memory IP address. The published International Patent Application No. WO2006/077261, entitled "METHOD FOR MANAGING ACCESS TO SHARED RESOURCES IN A MULTI-PROCESSOR ENVIRONMENT", and assigned to International Business Machines Corp., describes a technique to set the presence bit in the page table for the process having exclusive access to the page to indicate that the page is in the memory and set the presence bit for other processes to indicate that the page is not in the memory. Processes having the presence bit set to indicate the page is not in the memory will experience a page fault error preventing their access to the page to which exclusive access is granted. This page fault suspends the requesting process. Suspending the process trying to obtain the spinlock avoids costs associated with waiting processes retrying their request to obtain the spinlock.

There is a need in the art for further improved techniques for reducing costs associated with obtaining locks for shared memory addresses.

SUMMARY

Provided are a method, system, and article of manufacture for providing a process exclusive access to a page including a memory address to which a lock is granted to the process. A request is received for a memory address in a memory device from a requesting process. A lock is granted to the requested memory address to the requesting process. The requesting process is provided exclusive access to a page including the requested memory address for a page access time period. The exclusive access to the page provided to the requesting process is released in response to an expiration of the page access time period.

DETAILED DESCRIPTION

Figure 1:
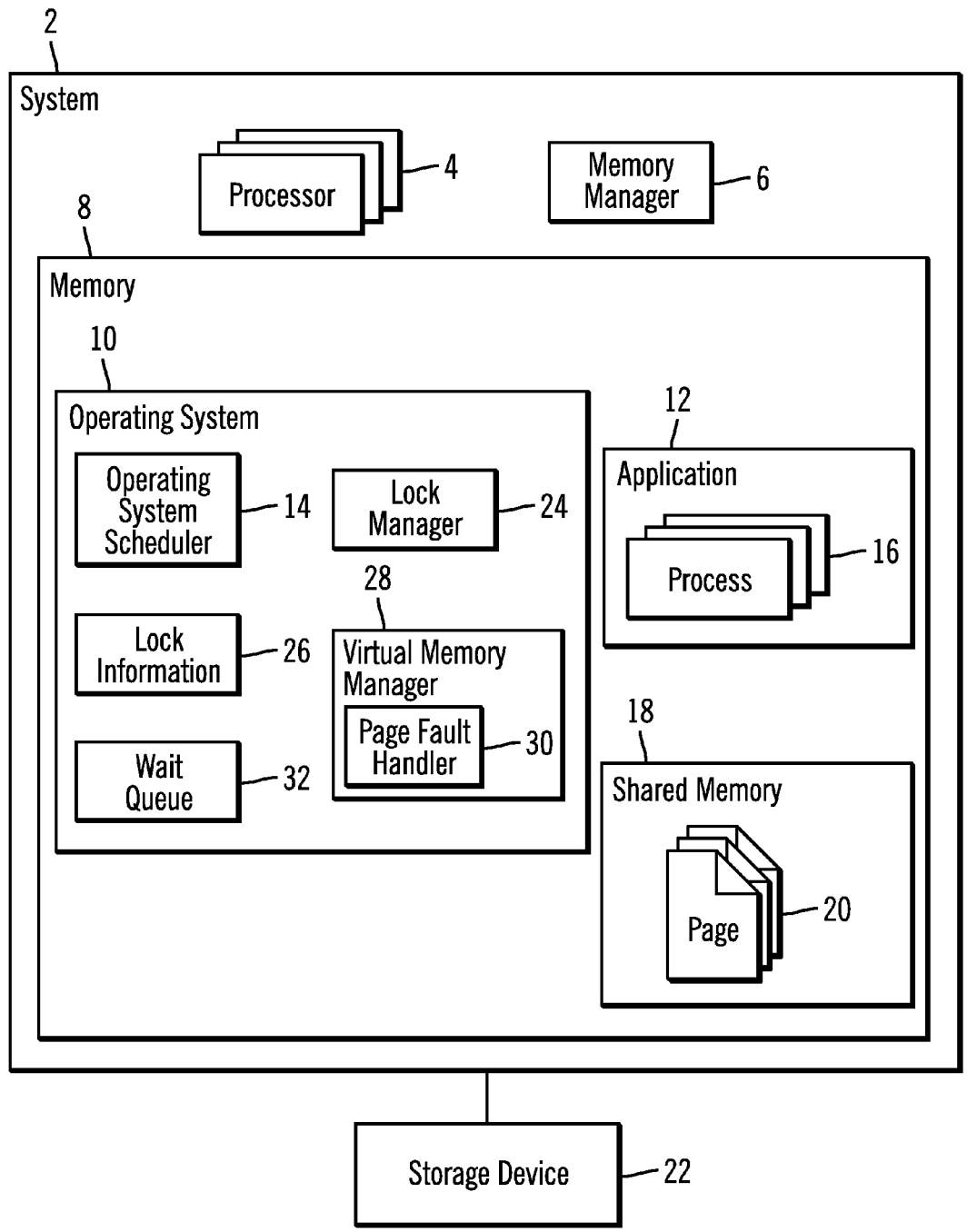
FIG. 1 illustrates an embodiment of a computing environment.

FIG. 1 illustrates an embodiment of a computing environment. A system 2 includes multiple processors 4 and a memory manager 6 managing access to a memory 8. Each processor 4 may include a separate memory manager 6. The processor 4 loads into the memory 8 an operating system 10 providing a runtime environment for one or more applications 12. An operating system scheduler 14 may spawn tasks 16 that perform the application 12 operations. The processes 16 may comprise processes, threads, etc. The processes 16 may be executed by one or more of the processors 4 and may concurrently access a shared memory 18. The shared memory 18 includes pages 20. The memory manager 6 may map received virtual addresses used by the operating system 10 and processes 16 to addresses in one of the pages 20. The data in the pages 20 may include data used by application processes 16 and data from a storage 22 coupled to the system 2. Pages 20 may be stored in the shared memory 18 or swapped to the storage 22 if there is not sufficient space for all the pages 20 in the memory.

If a process 16 requires access to a memory address in a page 20 to write to the page 20, then the operating system 10 would invoke a lock manager 24 to determine if the memory address is available for an exclusive lock. The lock manager 24 checks lock information 26 to determine whether to grant a lock for the process 16 requesting access to the memory address. If the lock is granted, then the process 16 may write to the memory address.

In one embodiment, the lock manager 24 operations may be performed outside of the kernel space of the operating system 10 and execute within the application space without intervention from the operating system 10 or hardware. For instance, if the lock manager 24 is granting spinlocks to process requests 16, then the lock manager 24 operations and spinlocks may be maintained within the user application space. Upon receiving a spinlock for a memory address in the shared memory 18, the requesting process 16 receiving the spinlock would access the resource covered by the spinlock. If another process 16 tries to access the resource covered by a granted spinlock, then that process 16 will retry the request after a predefined period until the spinlock is acquired. In alternative embodiments, the lock manager 24 may operate within the operating system 24 kernel space and grant lock types other than spinlocks.

If a process 16 references a memory address that resolves within a page 20 that is not available in the shared memory 18, then the memory manager 6 generates a page fault to a virtual memory manager 28 in the operating system 10 interfacing the memory manager 6 with the operating system 10. The virtual memory manager 28 includes a page fault handler 30 to process page fault errors from the memory manager 6. If the page fault error indicates a page 20 is not in the shared memory 18, then the page fault handler 30 loads the required page 20 from a paging file in the storage 22.

A wait queue 32 is used to queue processes 16 requesting a memory address in the shared memory 18 when another process has exclusive access to the page 20 including the requested memory address. Processes queued in the wait queue 32 are suspended and do not consume processor and memory bus resources retrying to obtain a lock, such as a spinlock, for the requested memory address. Queued processes 16 may be executed to retry to obtain the spinlock to the requested memory address.

Figure 2:
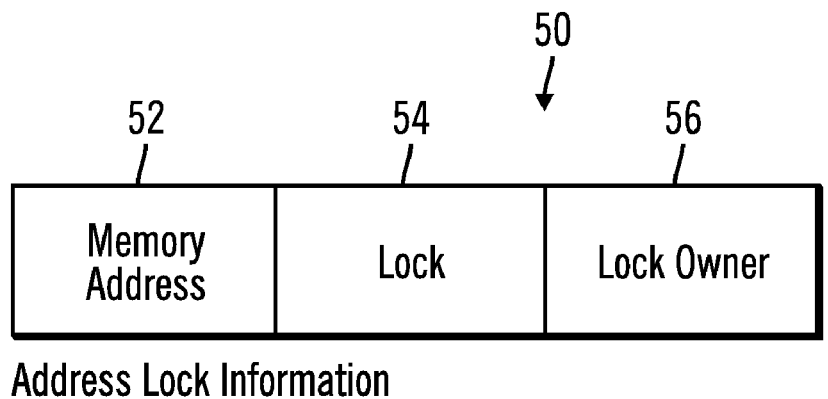
FIG. 2 illustrates an embodiment of address lock information.

FIG. 2 illustrates an embodiment of address lock information 50 maintained in the lock information 26 for each memory address that may be accessed in a page 20 in the shared memory 18. The address lock information 50 indicates a memory address 52 for which the lock information applies, such as a virtual address; a lock field 54 indicating whether a lock, e.g., spinlock, is held for the address 52, and a lock owner 56 indicating the process 16 holding the lock 54 for the memory address.

Figure 3:
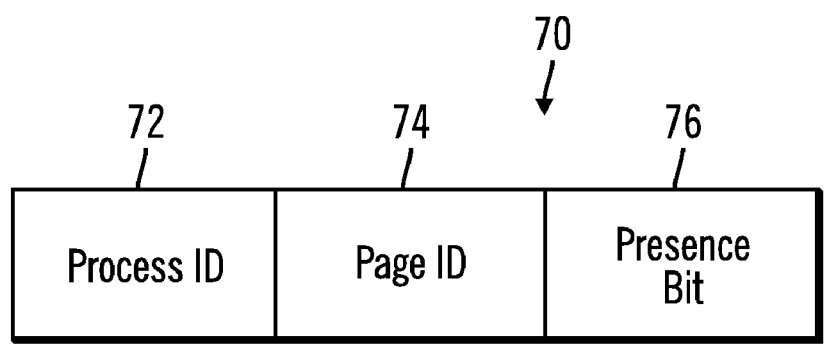
FIG. 3 illustrates an embodiment of a process page table entry.

FIG. 3 illustrates an embodiment of a process page table entry 70 maintained by the virtual memory manager 28 for each process 16 and page 20 indicating: a process identifier (ID) 72 identifying the process for which the table entry information 70 is maintained; a page ID 74 of the page 20; and a presence bit 76 indicating whether the page 74 is loaded in the shared memory 18.

Figure 4:
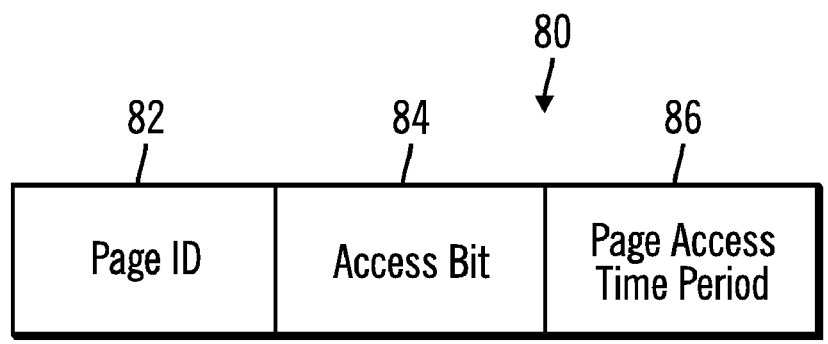
FIG. 4 illustrates an embodiment of page access information.

FIG. 4 illustrates an embodiment of page access information 80, maintained by the virtual memory manager 28 or other operating system 10 component, indicating a page ID 82 of a page 20 in the shared memory 20; an access bit 84 indicating whether a process 16 has exclusive access to the page 82, i.e., whether the page 20 is available in the shared memory 18; and a page access time period 86 indicating a time during which a process holding a lock on a requested memory address has exclusive access to the page 20 including the requested memory address. The page access time period 86 may be expressed as a number of clock cycles, processor time slice, or a number of processes executed by the process having exclusive access to the page 20.

Figure 5:
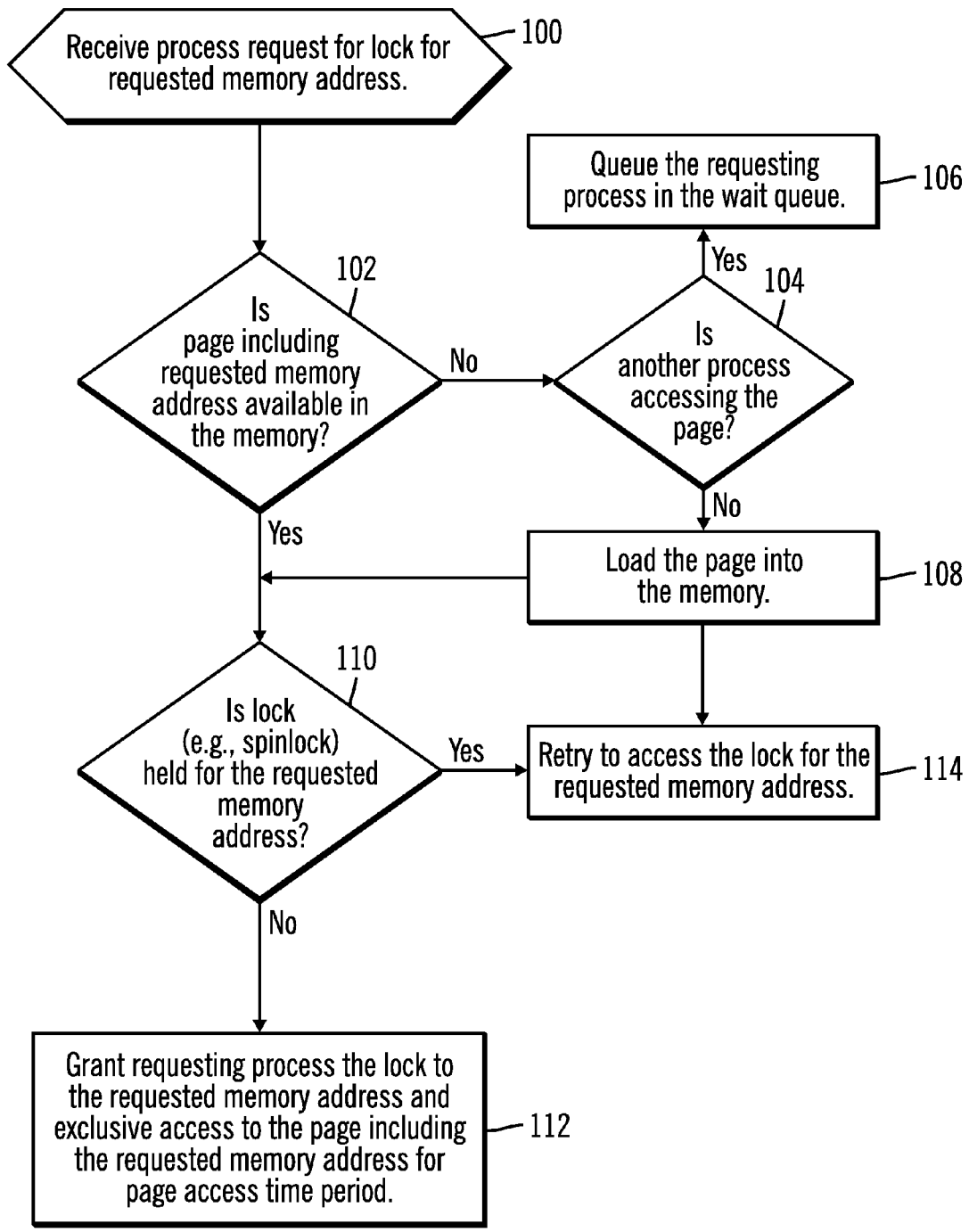
FIG. 5 illustrates an embodiment of operations to process a request for a lock to a requested memory address.

FIG. 5 illustrates an embodiment of operations performed by the lock manager 24 and other components of the operating system 10 to obtain a lock, e.g., a spinlock, for a requesting process 16 to access a requested memory address. Upon receiving (at block 100) a request for a spinlock for a requested memory address, if (at block 102) the page including the requested memory address is not available in the shared memory 18 and if (at block 104) another process 16 is accessing the page 20, i.e., has exclusive access to the page 20, then the requesting process is queued (at block 106) in the wait queue 32. If (at block 104) another process does not have exclusive access to the page 20, then the virtual memory manager 28 may load (at block 108) the page 20 into the shared memory 18. If (from the yes branch of block 102 or block 108) the page 20 including the requested memory address is available in the shared memory 18 and if (at block 110) a lock is not held for the requested memory address, as indicated in the address lock information 50, then the lock manager 24 grants (at block 112) the requesting process 16 the lock, e.g., spinlock, to the requested memory address and exclusive access to the page 20 including the requested memory address for a page access time period 86. If (at block 110) the lock is not available, then the requesting process may continue to retry (at block 114) accessing the requested memory address until the lock is released. If the lock comprises a spinlock, then the requesting process may continue to consume processor 4 and memory 8 bus resources 4 retrying the lock request for the requested memory address.

Figure 6:
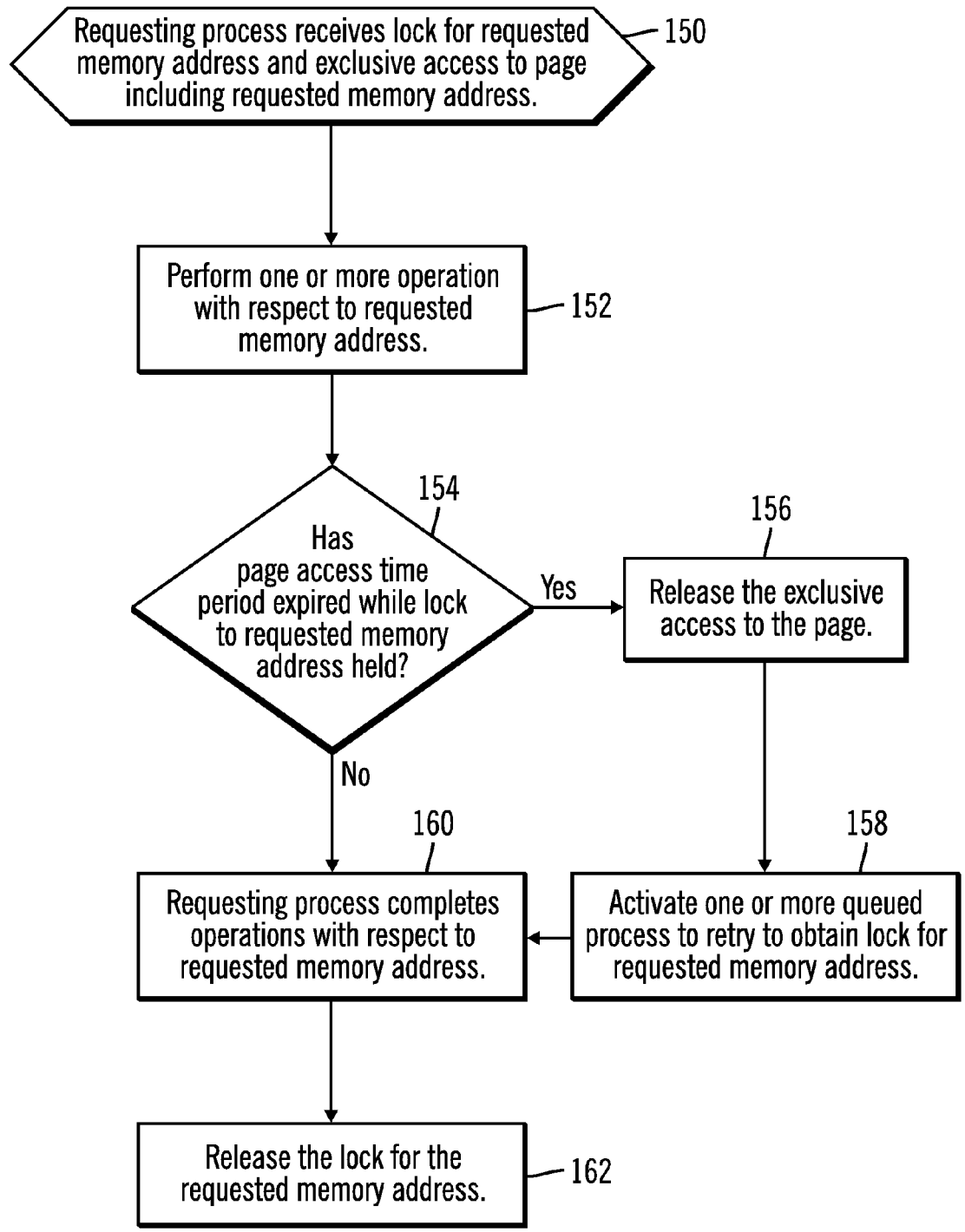
FIG. 6 illustrates an embodiment of operations performed when a process receives the lock for the requested memory address and exclusive access to the page including the requested memory address.

FIG. 6 illustrates an embodiment of operations performed by the process 16 holding the lock and the operating system 10 components to perform lock related operations. Upon the requesting process 16 receiving (at block 150) the lock for the requested memory address and exclusive access to a page 20 including the requested memory address, the process 16 performs (at block 152) one or more operations with respect to the requested memory address on which the lock is held. If (at block 154) the page access time period 86 has expired while the lock to the requested memory address is held, then an operating system 10 component, such as the lock manager 24 or virtual memory manager 28, may release (at block 156) the exclusive access to the page 20. One or more of the processes 16 queued in the wait queue 32 may be activated (at block 158) to retry their request for the memory address. The virtual memory manager 28, lock manager 24 or other operating system 10 component may execute the processes in the wait queue 32. From the no branch of block 154 or from block 158, when the requesting process 16 holding the lock, e.g., spinlock, completes (at block 160) operations with respect to requested memory address, then the lock manager 24 may release (at block 162) the lock, e.g., spinlock, for the requested memory address to allow one of the processes executed from the wait queue 32 or recent processes to try to obtain the spinlock.

With the described embodiments, a requesting process holding a lock, such as a spinlock, for a requested memory address is also provided exclusive access for a page access time period to the page including the requested memory address. Subsequent process requests to the memory address are suspended and queued in the wait queue 32 while the process has exclusive access to the page 20. This conserves processor resources because processes continually retrying to obtain the lock are suspended and placed in a wait queue 32 for a page access time period during which the process 16 holding the lock also has exclusive access to the page 20 including the requested memory address. Further, in described embodiments, the exclusive page access may be released after expiration of the page access time period 86 while the process still maintains the lock to the memory address. Queued processes that are activated may then continue to retry accessing the requested memory address while the process currently holding the lock maintains the spinlock after the time for exclusive page access has expired.

Figure 7:
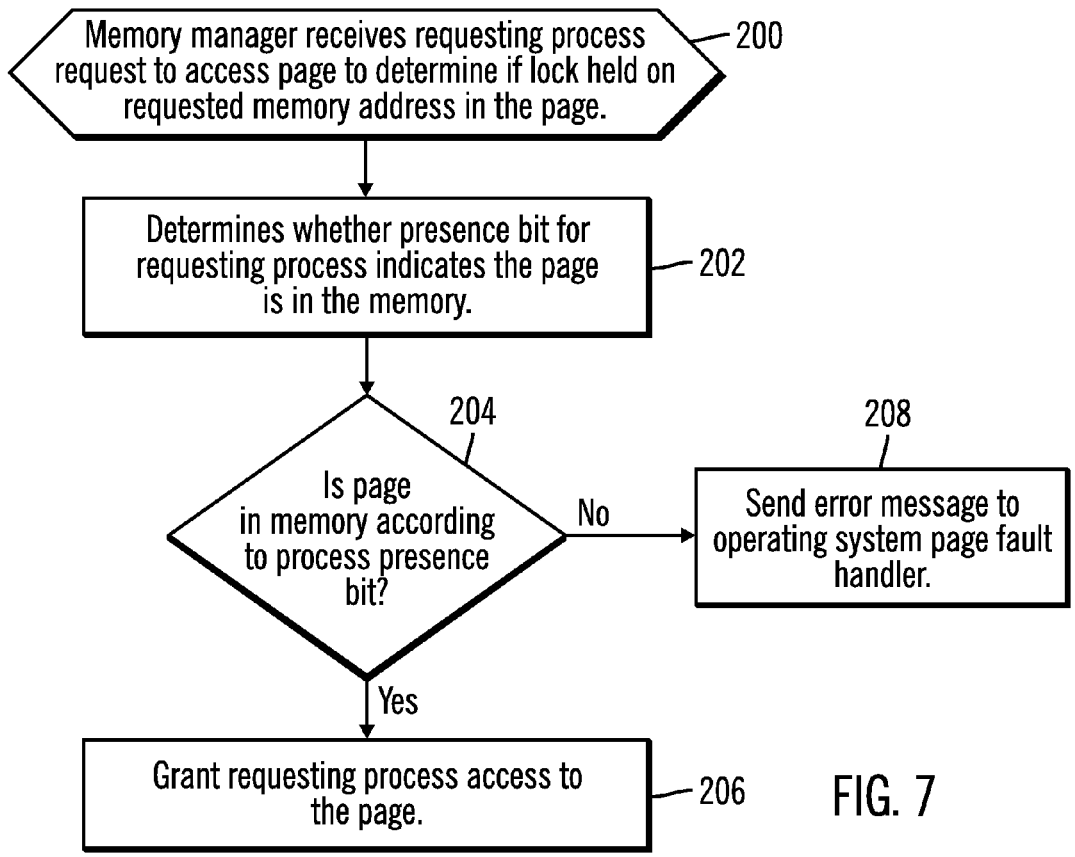
FIG. 7 illustrates an embodiment of operations of a memory manager to process a request from a process trying to obtain a lock for a memory address in a page.

FIGS. 7, 8, 9, and 10 illustrate an embodiment of operations to queue processes and provide a process holding the lock exclusive access to the page 20 using the memory manager 6, virtual memory manager 28, page fault handler 30 and/or other components. FIG. 7 illustrates an embodiment of operations performed by the memory manager 6 in response to receiving a request (at block 200) by a requesting process to access a page 20 to determine if the lock is held on a requested memory address in the page 20. The memory manager 6 determines (at block 202) whether the presence bit 76 (FIG. 3) for the requesting process 72 indicates that the page 74 is in the memory 18. If (at block 204) the page 20 is in the memory according to the process presence bit 76, then the memory manager 6 grants (at block 206) the requesting process access to the page 20 including the requested memory address. If (at block 204) the presence bit 76 for the requesting process 16 indicates the page 20 is not in the shared memory 18, then the memory manager 6 sends (at block 208) a page fault error message to the operating system page fault handler 30.

Figure 8:
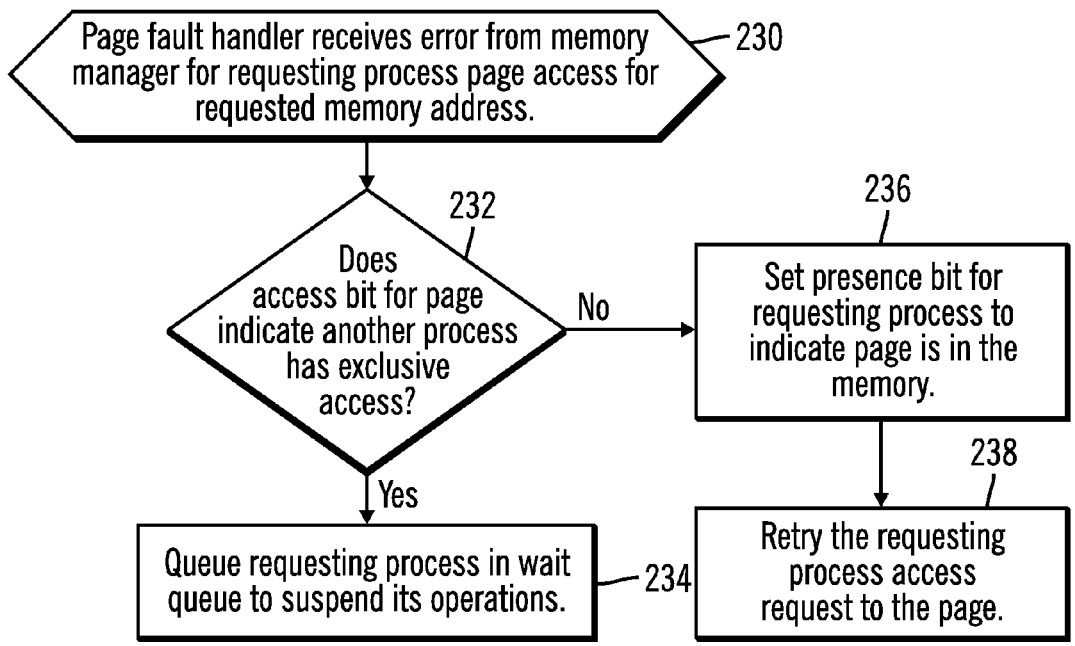
FIG. 8 illustrates an embodiment of operations a page fault handler performs to process a page fault error related to a requesting process attempting to access the page to obtain the lock for the requested memory address.

FIG. 8 illustrates an embodiment of operations performed by the page fault handler 30, virtual memory manager 28 and/or other operating system 10 components in response to a page fault error. Upon receiving (at block 230) the page fault error indicating the requesting process and requested page 20, the page fault handler 30 determines (at block 232) whether the access bit 84 (FIG. 4) for the page indicates that another process has exclusive access to the page 20. If so, then the requesting process is queued (at block 234) in the wait queue 32 to suspend the process operations. Otherwise, if the access bit 84 does not indicate that another process is accessing the page, then another process does not hold exclusive access to the page and the presence bit 76 (FIG. 3) for the requesting process is set (at block 236) to indicate that the page having the requested memory address is in the shared memory 18. The requesting process for which the page fault was generated is retried (at block 238) to retry to access the page 20.

Figure 9:
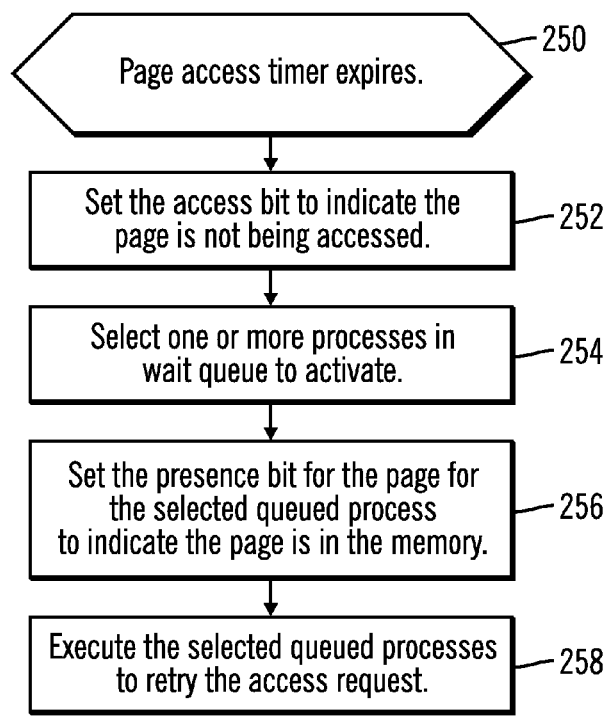
FIG. 9 illustrates an embodiment of operations performed when a page access time period expires indicating that exclusive access to the page has ended.

FIG. 9 illustrates an embodiment of operations performed by the operating system components 10 in response (at block 250) to the page access time period 86 (FIG. 4) expiring, which is the time for which the process holding the spinlock on the memory address also hold exclusive access to the page 20. When the time period 86 expires, the access bit 84 (FIG. 4) is set (at block 252) to indicate that the page 20 is not being accessed, which means exclusive access has been relinquished. The operating system 10 selects (at block 254) one or more processes in the wait queue 32 to activate to retry to access the memory address in the page 20 for which the exclusive access time period 86 has expired. The operating system 10 sets (at block 256) the presence bit 76 (FIG. 3) for the page for the selected queued processes to indicate that the page 20 is in the memory 20 and accessible. The selected queued processes 16 are executed (at block 258) to retry the access request to obtain the spinlock for the requested memory addresses. Once executed from the wait queue 32, the requesting processes will continue to consume processor 4 resources to retry the request for the lock, e.g., spinlock, for the requested memory address.

Figure 10:
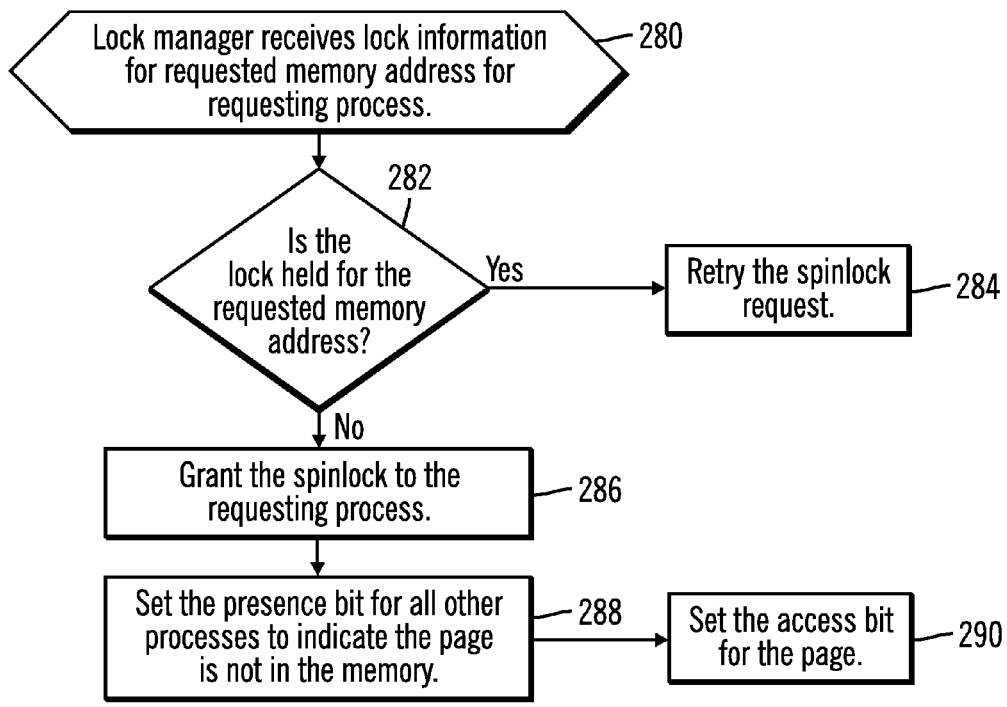
FIG. 10 illustrates an embodiment of operations to process a lock request for a requesting process given access to the page including the requested memory address.

FIG. 10 illustrates an embodiment of operations performed by the lock manager 24 and/or other operating system 10 components to determine whether to grant the lock, e.g., spinlock, for the requested memory address to the requesting process. The lock manager 24 receives (at block lock 280) information for the requested memory address and requesting process. If (at block 282) the lock 54 (FIG. 2) is held for the requested memory address, then the lock manager 24 denies the lock to cause the requesting process to retry (at block 284) the spinlock request. Otherwise, if the lock is not held, then the lock manager 24 grants (at block 186) the spinlock to the requesting process 16 and sets (at block 288) the presence bit 76 for all other processes having a process page table entry 72 for the page 20 to indicate the page 20 is not in the shared memory 18. The access bit 84 for the page 20 is set (at block 290) to indicate that exclusive access to the page 20 is held by the process granted the lock to the requested memory address.

With the described operations of FIGS. 7, 8, 9, and 10, a process 16 having the spinlock to a memory address in the shared memory 18 is provide exclusive access to the page 20 including the requested memory address by indicating to the process 16 holding the lock that the page is present in memory 18 and setting the presence bit for other processes trying to read the page to indicate that the page is not present in the memory 18. After the page access time period 86 expires, exclusive access to the page is released even if the process holding the lock continues to hold the memory address lock, e.g., spinlock. In one embodiment, exclusive access is released by setting the access bit 84 to indicate that the page is no longer exclusively held to allow other processes 16 access to the page even if the lock to the memory address is still held to retry to obtain the spinlock.

With the described embodiments, processes seeking to access a memory address for which a lock is held are suspended and placed in a wait queue by providing the process holding the lock exclusive access to the page for a predetermined page access time. Once the page access time period expires, exclusive access to the page is released to allow the processes in the wait queue to retry their request for the memory address until the process holding the lock, e.g., spinlock, for the memory address releases the lock.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 2, 3, and 4 provide an embodiment of lock and page information. In alternative embodiments, the lock information shown in FIGS. 2, 3, and 4 may be arranged in alternative manners and include additional information.

The illustrated operations of FIGS. 5, 6, 7, 8, 9, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable medium including code for interfacing with a memory device and performing operations, the operations, comprising:

receiving a request for a memory address in the memory device from a requesting process;

granting a lock to the requested memory address to the requesting process;

setting an access bit for a page including the requested memory address for a page access time period to provide the requesting process exclusive access to the page for the page access time period; and releasing the exclusive access to the page provided to the requesting process in response to an expiration of the page access time period.

2. The article of manufacture of claim 1, wherein the requesting process holds the lock to the requested memory address after the exclusive access for the page is released in response to the expiration of the page access time period.

3. The article of manufacture of claim 2, wherein the granted lock to the memory address comprises a spinlock, wherein subsequent processes seek spinlocks to access the requested memory address, and wherein the operations further comprise:

continuing, by the subsequent processes, to retry the request for the spinlock while the requesting process holds the spinlock for the requested memory address after the exclusive access to the page including the requested memory address is released in response to the page access time period expiring.

4. The article of manufacture of claim 1, and wherein the operations further comprise:

receiving a request from a subsequent process for the requested memory address while the lock is held by the requesting process;

queuing the subsequent process in a wait queue in response to the requesting process having exclusive access to the page including the requested memory address, wherein processes in the wait queue do not retry to access the requested memory address; and retrying execution of the subsequent process in the wait queue to retry the request for the requested memory address in response to the exclusive access to the page being released in response to the expiration of the page access time period.

5. The article of manufacture of claim 4, wherein granting the requesting process exclusive access to the page comprises:

setting a presence bit for the page and the requesting process to indicate the page is in the memory device in response to granting the lock to the requesting process, wherein the presence bit for the page for the subsequent process indicates the page is not in the memory device;

invoking a page fault handler in response to the subsequent process accessing the page to read the lock for the requested memory address when the presence bit for the subsequent process and the page indicates the page is not in the memory device, wherein the subsequent process is placed in the wait queue in response to invoking the page fault handler.

6. The article of manufacture of claim 5, and wherein the operations further comprise:

determining, by the page fault handler, whether the access bit of the page indicates that the page is being accessed in response to being invoked, wherein the subsequent process is queued in the wait queue in response to the page fault handler determining that the access bit for the page indicates that the page is being accessed.

7. The article of manufacture of claim 6, and wherein the operations further comprise:

setting the presence bit for the page and the subsequent process attempting to access the page to indicate that the page is in the memory device in response to the access bit indicating that the page is not being accessed; and retrying the subsequent process to request the requested memory address in response to setting the presence bit for the page and the subsequent process to indicate that the page is in the memory device.

8. The article of manufacture of claim 4, wherein the wait queue includes a plurality of subsequent processes requesting memory addresses in the page for which the requesting process has exclusive access, wherein activating the subsequent process from the wait queue comprises activating one or more of the subsequent processes in the wait queue to retry to obtain the lock on the requested memory address.

9. A system, comprising:
a processor implementing a plurality of processes;
a memory device having memory addresses;
a computer readable medium including a program executed by the processor to perform operations, the operations comprising:
receiving a request for one of the memory addresses in the memory device from a requesting process;
granting a lock to the requested memory address to the requesting process;
setting an access bit for a page including the requested memory address for a page access time period to provide the requesting process exclusive access to the page for the page access time period; and
releasing the exclusive access to the page provided to the requesting process in response to an expiration of the page access time period.

10. The system of claim 9, wherein the requesting process holds the lock to the requested memory address after the exclusive access for the page is released in response to the expiration of the page access time period.

11. The system of claim 10, wherein the granted lock to the memory address comprises a spinlock, wherein subsequent processes seek spinlocks to access the requested memory address, wherein the operations further comprise:

continuing, by the subsequent processes, to retry the request for the spinlock while the requesting process holds the spinlock for the requested memory address after the exclusive access to the page including the requested memory address is released in response to the page access time period expiring.

12. The system of claim 9, wherein the operations further comprise:

receiving a request from a subsequent process for the requested memory address while the lock is held by the requesting process;

queuing the subsequent process in a wait queue in response to the requesting process having exclusive access to the page including the requested memory address, wherein processes in the wait queue do not retry to access the requested memory address; and retrying execution of the subsequent process in the wait queue to retry the request for the requested memory address in response to the exclusive access to the page being released in response to the expiration of the page access time period.

13. The system of claim 12, wherein granting the requesting process exclusive access to the page comprises:

setting a presence bit for the page and the requesting process to indicate the page is in the memory device in response to granting the lock to the requesting process, wherein the presence bit for the page for the subsequent process indicates the page is not in the memory device;

invoking a page fault handler in response to the subsequent process accessing the page to read the lock for the requested memory address when the presence bit for the subsequent process and the page indicates the page is not in the memory device, wherein the subsequent process is placed in the wait queue in response to invoking the page fault handler.

14. The system of claim 13, further comprising:

determining, by the page fault handler, whether the access bit of the page indicates that the page is being accessed in response to being invoked, wherein the subsequent process is queued in the wait queue in response to the page fault handler determining that the access bit for the page indicates that the page is being accessed.

15. A computer implemented method, comprising:
receiving a request for a memory address in a memory device from a requesting process;
granting a lock to the requested memory address to the requesting process;
setting an access bit for a page including the requested memory address for a page access time period to provide the requesting process exclusive access to the page for the page access time period; and
releasing the exclusive access to the page provided to the requesting process in response to an expiration of the page access time period.

16. The method of claim 15, wherein the requesting process holds the lock to the requested memory address after the exclusive access for the page is released in response to the expiration of the page access time period.

17. The method of claim 16, wherein the granted lock to the memory address comprises a spinlock, wherein subsequent processes seek spinlocks to access the requested memory address, further comprising:

continuing, by the subsequent processes, to retry the request for the spinlock while the requesting process holds the spinlock for the requested memory address after the exclusive access to the page including the requested memory address is released in response to the page access time period expiring.

18. The method of claim 15, further comprising:
receiving a request from a subsequent process for the requested memory address while the lock is held by the requesting process;

queuing the subsequent process in a wait queue in response to the requesting process having exclusive access to the page including the requested memory address, wherein processes in the wait queue do not retry to access the requested memory address; and retrying execution of the subsequent process in the wait queue to retry the request for the requested memory address in response to the exclusive access to the page being released in response to the expiration of the page access time period.

19. The method of claim 18, wherein granting the requesting process exclusive access to the page comprises:

setting a presence bit for the page and the requesting process to indicate the page is in the memory device in response to granting the lock to the requesting process, wherein the presence bit for the page for the subsequent process indicates the page is not in the memory device;

invoking a page fault handler in response to the subsequent process accessing the page to read the lock for the requested memory address when the presence bit for the subsequent process and the page indicates the page is not in the memory device, wherein the subsequent process is placed in the wait queue in response to invoking the page fault handler.

20. The method of claim 19, wherein the operations further comprise:

determining, by the page fault handler, whether the access bit of the page indicates that the page is being accessed in response to being invoked, wherein the subsequent process is queued in the wait queue in response to the page fault handler determining that the access bit for the page indicates that the page is being accessed.

* * * * *